Nov. 22, 1955  L. C. RUBIN  2,724,672
METHOD OF APPLYING THERMOPLASTIC
POLYMERS TO SOLID SURFACES
Filed Nov. 29, 1951

INVENTOR.
LOUIS C. RUBIN
BY
ATTORNEYS

# United States Patent Office 2,724,672
Patented Nov. 22, 1955

2,724,672

METHOD OF APPLYING THERMOPLASTIC POLYMERS TO SOLID SURFACES

Louis C. Rubin, West Caldwell, N. J., assignor to The M. W. Kellogg Company, Jersey City, N. J., a corporation of Delaware Application November 29, 1951, Serial No. 258,981

10 Claims. (Cl. 154—82)

This invention relates to a method for applying a thermoplastic polymer. In one aspect, the invention relates to a method for applying a thermoplastic comprising a polymer of trifluorochloroethylene. More particularly in this aspect, the invention relates to a method for applying a thermoplastic comprising a polymer of trifluorochloroethylene to a solid surface as a lining or coating.

Polytrifluorochloroethylene thermoplastics may be used to coat the surface of various materials such as metals, ceramics and other materials of construction which are susceptible to the corrosive action of many reagents. In particular, metals such as iron, aluminum, copper, or alloys, and ceramics may be coated with a solid polymer of trifluorochloroethylene and rendered substantially inert or chemically resistant, in the course of performing their chemical functions, when exposed to various powerful oxidizing agents such as fuming nitric acid, sulfuric acid, hydrofluoric acid, motor fuels used as rocket propellants, and various reagents such as aqua regia, hydrochloric acid and other strong acids and caustic solutions. The solid polymer of trifluorochloroethylene or thermoplastic compositions comprising a solid polymer of trifluorochloroethylene may be applied to such surfaces, either in the form of thin films or coatings having thicknesses as low as 0.001" to about 0.010", or as coatings or linings of one or more inches in thickness. The solid polymer has been found useful as a lining or coating for metal piping or storage vessels, or as an insulating material on flat surfaces or unenclosed surfaces, such as on the plates of electrical condensers. Various other uses and applications of the solid trifluorochloroethylene polymer, where corrosion-resistance or electrical insulating properties are required, will readily suggest themselves to those skilled in the art.

The solid polymer may be applied to various surfaces by softening or melting the polymer and coating the surface with the polymer in the fluid state. Such manner of applying the polymer to the surface presents, however, certain disadvantages. One disadvantage lies in the polymer possessing a tendency to undergo decomposition at the temperature at which it can be applied or flowed-on in a fluid state. Furthermore, in this respect, there is a tendency of the products of decomposition to corrode the surface, particularly metallic surfaces, with which they come into contact. Another disadvantage lies in the difficulty in applying thin films of the solid polymer upon the surface to be coated. This is particularly apparent, in instances where it is desired to apply such films or coatings to the interior surfaces of metal or ceramic piping and other cylindrical or irregularly-shaped vessels.

It is, therefore, an object of the present invention to provide an improved method for applying normally solid polytrifluorochloroethylene to solid surfaces as a lining or coating.

Another object of the invention is to provide an improved method for applying a thermoplastic comprising a polymer of trifluorochloroethylene to a solid surface as a lining or coating.

Still another object of the invention is to provide an improved method for applying normally solid polytrifluorochloroethylene to a solid surface as a lining or coating which will firmly and uniformly adhere to such surface.

Still another object of the invention is to provide an improved method for applying a thermoplastic comprising a polymer of trifluorochloroethylene to a solid surface as a lining or coating which will firmly and uniformly adhere to such surface.

Various other objects and advantages of the present invention will become apparent to those skilled in the art, from the accompanying description and disclosure.

According to the method of the present invention, as more fully hereinafter described, it has been found that coatings or linings of normally solid polytrifluorochloroethylene, of varying thicknesses, can be applied to solid surfaces which will firmly adhere to the surface without the polymer undergoing decomposition, and thus avoid the corrosive action of the products of decomposition upon the surface to which the solid polymer is to be bonded. In general, the improved process comprises (as more fully hereinafter disclosed) placing a layer of a solid polymer of trifluorochloroethylene, or a thermoplastic comprising a polymer of trifluorochloroethylene, on the surface to be coated; maintaining suitable temperature conditions on this surface; and maintaining suitable compacting pressure on the layer of the solid polymer or thermoplastic composition containing the solid polymer, to bring it into intimate contact with the heated surface for a time sufficient to permit the solid layer to adhere thereto. This procedure may then be followed by positive cooling of the coating or lining in order to prevent or limit the degree of crystallization of the polymer, which may affect the physical properties of the coating or lining.

The preparation of the monomer, trifluorochloroethylene, from which the desired solid polymer is obtained, is accomplished by dechlorinating Freon 113 (1,1-2 trifluorotrichloroethane) under suitable conditions of dehalogenation in the presence of a solvent, such as methyl alcohol, and a metallic dehalogenating agent, such as zinc dust, to produce an effluent comprising the monomer trifluorochloroethylene, including unreacted trifluorochloroethylene and solvent. This effluent is next passed to a suitable fractional distillation system from which substantially pure trifluorochloroethylene is recovered as a relatively low-boiling fraction.

The monomer thus obtained is polymerized under suitable polymerization conditions, with or without the presence of a suitable catalyst or promoter. Such conditions may include the use of a catalyst comprising an organic peroxide, such as bis-trichloroacetyl peroxide, preferably dissolved in a suitable solvent, such as trichlorofluoromethane, at a temperature between about −20° C. and about 25° C., and preferably at a temperature of about −16° C., at which temperature the plastic is produced. At a temperature of about −16° C. the polymerization of trifluorochloroethylene to a satisfactory yield of the plastic polymer is accomplished in about seven days. At elevated temperatures and super-atmospheric pressures, less time is required to complete the polymerization and waxes are generally produced. As the preparation of the polymer is not a part of this invention, further discussion thereof is believed to be unnecessary and numerous applications have been filed on the preparation of the polymer, including both plastic and wax. After the desired extent of polymerization has taken place, the resulting polymerization reaction mixture is removed from the polymerization zone and the polymeric product is separated from the solvent or the catalyst or polymerizing agent.

The plastic polymer produced from trifluorochloroethylene possesses certain desirable physical and chemical characteristics, with four-fifths of the weight of the polymer being made up of two halogens, fluorine and chlorine. These polymers are colorless, transparent, and have been found to possess high chemical stability with no effect being observed on the polymer after long exposure to concentrated sulfuric, hydrofluoric and hydrochloric acids, fuming nitric acid, strong caustics, aqua regia, and other vigorous oxidizing agents. The polymer is hard but not brittle, and is flowable at temperatures above about 500° F. In addition, the polymer is flexible and resilient, but is not wetted by water or affected by high humidity. The polymer also has superior electrical insulating characteristics. The bonding of these polymers to solid surfaces requires a certain degree of care, as more fully hereinafter disclosed, inasmuch as they tend to change their physical characteristics, in varying degrees, under the influence of the bonding conditions.

In applying or bonding the aforementioned solid polymer of trifluorochloroethylene, or a thermoplastic comprising a polymer of trifluorochloroethylene, to a solid surface, in accordance with the process of the present invention, the proper temperature to be maintained on this surface is determined by reference, directly or indirectly, to the molecular weight of the solid polymer which is to be applied. It is impractical, however, to ascertain the molecular weight for each trifluorochloroethylene thermoplastic polymer to be applied as a lining or coating to a solid surface, under normal circumstances. Accordingly, a simple test has been devised which provides a direct indication as to the proper temperature to be maintained upon the surface to which the solid plastic is to be bonded. This test comprises measurements of the temperature at which no tensile strength is exhibited under the conditions of the test. The test is applied to standard or test pieces of the plastic material. This temperature is referred to as the "no strength temperature" or "no strength temperature value," and is abbreviated N. S. T. Accordingly, the N. S. T. value serves as a useful guide in the molding of plastics, and has particular applicability to plastics comprising essentially polytrifluorochloroethylene. The measurement of the N. S. T. value is carried out in suitable apparatus on a strip of the plastic measuring 2" by 1/8" by 1/16". Conveniently, such strips may be notched or grooved in a straight line across one large surface at the center, transversely to the longitudinal axis. The notch or groove, is made perfectly straight and extended to a depth of 1/64". The strength test is then applied to the point of minimum cross-section. The sample is suspended vertically, with a small weight (approximately 4" long), suspended from the lower end of the test strip on a fine wire. The above-mentioned weight is so adjusted that the total weight from the notch down is 0.5 gram. The test piece is suspended in a suitable chamber whose internal temperature is brought up to 410° F. The temperature is then raised at a rate of 2.7° F. per minute until the sample pulls apart at the notch. The N. S. T. value is the temperature at which the test strip is pulled in two. This determination is not highly sensitive to small variations in test strip thickness (±0.003"), however, care must be taken to cut a sharp, clean notch of uniform depth. Differences of 10° F. are normally considered significant.

As previously indicated, in accordance with the method of the present invention a layer of a solid polymer of trifluorochloroethylene or a thermoplastic comprising a polymer of trifluorochloroethylene, is placed on the surface to be coated. This layer may be in the form of a sheet or film, when the polymer is to be applied to a flat surface; or in the form of a tube or sheath of varying thicknesses, when the polymer is to be applied to the interior surface of metal, steel, or ceramic piping and other cylindrical vessels. In instances in which the polymer is to be applied to the interior surface of piping or other cylindrical vessels, it is preferred that the outside diameter of this tube be only slightly smaller than the inside diameter of the piping, whose internal surface it is desired to coat with the solid polymer, in order to insure maximum bonding between this surface and the polymer. It is also desirable that the surface to which the solid polymer is to be applied, be roughened or subjected to abrasion to enable the polymer, when heated to a fluid state, to flow into the roughened surface in order to obtain firm bonding or adherence. Such roughening or abrasion of the surface may be obtained by such mechanical means as grinding, hammering, knurling, sand-blasting or etching. It is not necessary that the abrasion be of appreciable depth; however, it is preferred that such depth be not greater than the thickness of the film or layer of the plastic which is to be applied to the surface.

It has been indicated that suitable temperature conditions must be maintained on the surface to which the layer of the solid polymer of trifluorochloroethylene is to be applied. For this purpose, the surface may be heated to the desired temperature conditions (as hereinafter described) by various heating means. It is preferred that the surface be electrically heated, either by resistance, induction, or dielectric heating. Where the material to be coated comprises a flat surface, the layer of solid polymer may be placed upon the surface of the object to be coated, and the other surface may be heated by electrical resistance means or through the use of heating coils in contact with the surface which is not to be coated with the solid polymer. In some instances the object whose surface is to be coated, may be placed in an oven, with the solid polymer resting upon the surface to be coated. In instances where the object to be coated comprises metal or ceramic tubing or piping, or is in the form of a cylindrical vessel, it is preferred that the external surface of this object be surrounded by resistance wiring or heating coils, from which heat is transmitted to the interior surface and thus bring the solid polymer into a fluid condition for being bonded to this surface. It may also be desirable to place the piping or cylindrical object in an oven, so that heat may be transmitted into the interior surface of the object for bonding the solid polymer thereto. Various other means for heating the surface to which the solid polymer is to be bonded, may suggest themselves to those skilled in the art, and since the novelty of the present invention does not reside in the heating apparatus employed, further description thereof is believed to be unnecessary.

As previously indicated, the proper temperature to be maintained on the surface to which the solid polymer of trifluorochloroethylene, or a thermoplastic comprising a polymer of trifluorochloroethylene, is to be bonded is determined by reference to the N. S. T. value of the polymer which is to be applied. In accordance with the method of the present invention, it has been found that a layer of the solid polymer of trifluorochloroethylene or a layer of a thermoplastic comprising a solid polymer of trifluorochloroethylene having an N. S. T. value between about 220° C. and about 350° C. can be satisfactorily bonded to the solid surface at a temperature, maintained on the surface of the object to which the polymer is to be bonded, between about 360° F. and about 625° F. The polymers having an N. S. T. value between about 240° C. and about 350° C. are preferably bonded at a surface temperature between about 400° F. and about 625° F., while polymers having an N. S. T. value between about 240° C. and about 300° C. are preferably bonded at a surface temperature between about 400° F. and about 590° F. In general, it is found that as the N. S. T. value of the polymer is increased, the temperature maintained upon the surface should also be increased within the aforementioned temperature ranges. With a given N. S. T.

value polymer, it is preferred to obtain the bonding effect at as low a temperature as possible within these temperature ranges. Polymers having a relatively low N. S. T. value, such as 240° C., flow easier at a given bonding temperature and produce a relatively harder lining or coating upon the surface to which they are applied; while polymers having a relatively high N. S. T. value, such as 350° C., are more viscous at this bonding temperature and produce a more flexible lining or coating.

As previously indicated, in addition to maintaining suitable temperature conditions on the surface to which the polymer is to be bonded, it is also necessary that suitable compacting pressure be applied on the layer of the solid polymer or thermoplastic composition containing the solid polymer, in order to bring it into intimate contact with the heated surface for a time sufficient to permit the solid layer to adhere thereto. Such pressure may be obtained by various means. Where the surface to be coated is flat, a platen may be employed to press the layer of the solid polymer against the heated surface to be coated. While relatively high pressures may be imposed upon the platen in this operation, nevertheless slight pressure, which may be merely the pressure exerted by the weight of the platen itself, may also be satisfactorily employed in instances where the surface is to be coated with a thin film of the solid polymer, e. g. from about .001″ to 0.010″. In instances where the layer of the polymer to be bonded is of appreciable thickness, pressures as high as 25,000 pounds per square inch may be employed.

As indicated above, the solid polymer may be applied or bonded to the interior heated surface of metal or ceramic piping or other cylindrical vessels. In such instances, the pressure to be applied against the layer of solid trifluorochloroethylene polymer tubing, may be obtained by introducing a gas into the tube or sheath of the solid polymer which is sufficient to cause the walls of the tube to expand and to be brought into intimate contact with the interior heated surface to which it is to be bonded. In this modification, it is desirable that both ends of the solid trifluorochloroethylene tube or lining be completely sealed, having an opening at one point into which a nozzle or other means may be inserted for introducing the pressuring gas. Gas employed for this purpose may be in the form of air, steam or other gases or combinations of gases, with the pressure of the gas adjusted in each instance in accordance with the thickness of the layer of the solid polymer which is to be applied, so that sufficient internal pressure is maintained which will hold the walls of the polymer tubing against the internal surface to which it is to be bonded. The actual bonding time is not critical and will depend in each instance upon the temperature at which bonding is made to take place. At higher temperatures, bonding takes place more rapidly, and may only be a matter of seconds, where the solid polymer is employed as a thin film. In other instances, where relatively lower pressures are employed or where the polymer is of considerable thickness, the bonding time may require several minutes in order to obtain firm and uniform adherence of the polymer to the surface to which it is to be applied.

As previously indicated, the heated coating or lining after being bonded to the surface, is cooled and is then ready for use. Such cooling may be merely that which is caused by contact of the lining with the atmosphere, after the source of heat which has been applied to the surface has been shut off. However, rapid positive cooling of the bonded polymer is preferred in most instances in order to limit the degree of crystallization of the polymer. Such limitation of the degree of crystallization will affect the physical properties of the trifluorochloroethylene coating or lining. These properties have been found to vary from those of an amorphous trifluorochloroethylene material to those of a crystalline material. The amorphous material is transparent, softer, tougher and more flexible than the crystalline material. The latter tends to be milky in appearance and harder and more resistant to distortion. The degree of crystallization is determined primarily by the rapidity by which the bonded polymer is cooled or quenched to approximately 300° F. from its transition temperature. The fluid viscosity of the polymer being molded will affect the rate of crystallization, so that the higher the N. S. T. value the lower the rate of crystallization. Similarly, when the N. S. T. value is lowered, the rate of crystallization will be more rapid. Therefore more rapid cooling is necessary if it is desired to avoid or limit crystallization. For example, quenched polytrifluorochloroethylene plastic having an N. S. T. value of 220° C., while flexible at room temperature, will crystallize fairly rapidly at temperatures as low as 250° F. and become brittle. Quenched trifluorochloroethylene plastic having an N. S. T. value of 270° C. will show comparatively little change on heating to the same temperature for prolonged periods; and even if crystallized by heating at relatively higher temperatures, will retain its toughness.

In cooling the polymer coating rapidly in order to limit crystallization, it is preferred to employ low-pressure steam as an initial coolant, followed by the use of water maintained at room temperature. Suitable cooling means may comprise the use of cooling coils or other media by means of which heat, which was previously transmitted for effecting the bonding of the solid polymer, may be withdrawn. In general, it is preferred that the surface upon which the polymer has been bonded, be maintained at a temperature between about 70° F. and below about 350° F., in order to limit crystallization of the bonded polymer and place the coating or lining in a condition suitable for use. It has also been found desirable in this respect, to maintain the same pressure at which the bonding of the solid polymer was made to take place, during the cooling phase until the desired reduction in temperature of the bonded surface has been obtained.

In the description of the operating conditions for carrying out the aforementioned bonding of the solid polymer of trifluorochloroethylene, reference has been had to the material bonded as comprising either the solid polymer itself, or a thermoplastic comprising a polymer of trifluorochloroethylene. In this respect, it should be noted, that the present invention includes within its scope the presence of minor amounts of plastic compositions other than the polymers of the present invention which do not materially affect the characteristics of polytrifluorochloroethylene. In this respect, it has also been found desirable to incorporate plasticizing agents with the solid polytrifluorochloroethylene polymer, employing such plasticizers as polytrifluorochloroethylene itself, but in an oil or waxy state. The invention also includes within its scope solid polymers of trifluorochloroethylene in combination with minor amounts of other monomers such as fluorochloroisobutene, diphenyldifluoroethylene, tetrafluoroethylene, vinylidene fluoride, vinylfluoride, vinyl chloride, vinylidene chloride, perfluoropropene, trifluoroethylene, and acrylonitrils. The use of these other monomers in combination with trifluorochloroethylene is limited to less than about 15%, and preferably not more than 5%, of the trifluorochloroethylene polymer.

The method of bonding a thermoplastic material comprising a solid polymer of trifluorochloroethylene to a surface, is shown, in one embodiment of the invention, by Figures 1, 2, and 3 of the accompanying drawing in which.

Figure 1:
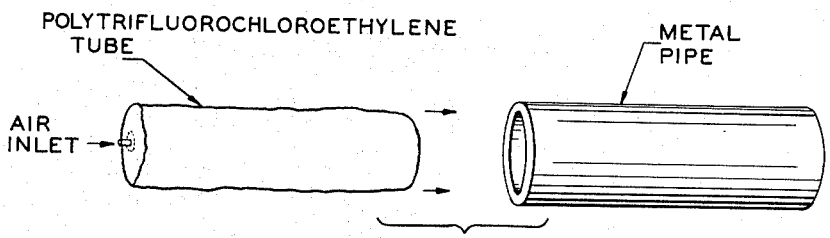
Figure 1 is a perspective view of an uninflated polytrifluorochloroethylene tube, as previously described, prior to its insertion and bonding treatment in a metal pipe.
Figure 2:
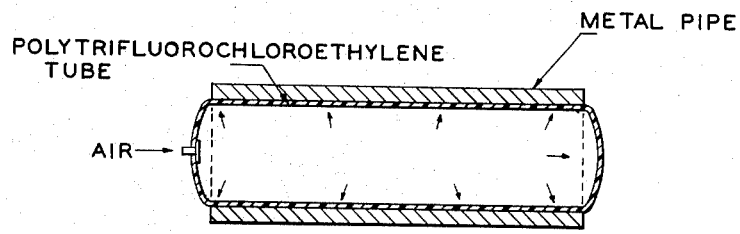
Figure 2 is a diagrammatical longitudinal view of the polytrifluorochloroethylene tube, positioned within the metal pipe and ready for application of the required heat and pressure for bonding.
Figure 3:
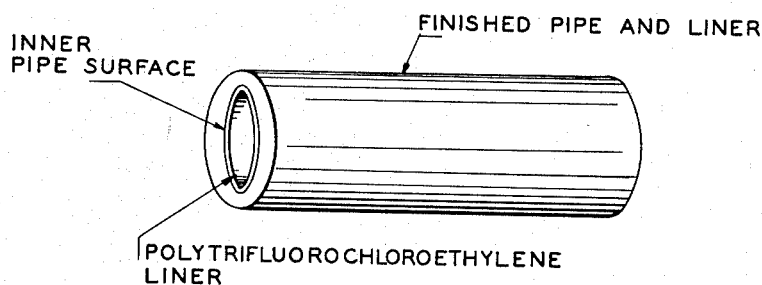
Figure 3 is a perspective view of the finished polytrifluorochloroethylene-lined metal pipe, produced in accordance with the above-mentioned modification of the method of the present invention.

Various other modifications and embodiments of the above invention may be apparent to those skilled in the art, without departing from the scope of the invention.

I claim:

1. A method for applying a thermoplastic polymer of trifluorochloroethylene to a curved surface which comprises placing a layer of a thermoplastic comprising a polymer of trifluorochloroethylene having a no strength temperature value between about 220° C. and about 350° C. on said surface, heating said surface to a temperature between about 360° F. and about 625° F., and after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto.

2. A method for applying a thermoplastic polymer of trifluorochloroethylene to a curved surface which comprises placing a layer of a thermoplastic comprising a polymer of trifluorochloroethylene having a no strength temperature value between about 240° C. and about 350° C. on said surface, heating said surface to a temperature between about 400° F. and about 625° F., and after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto.

3. A method for applying a thermoplastic polymer of trifluorochloroethylene to a curved surface which comprises placing a layer of a thermoplastic comprising a polymer of trifluorochloroethylene having a no strength temperature value between about 240° C. and about 300° C. on said surface, heating said surface to a temperature between about 400° F. and about 590° F., and after initially heating said surface to the desired temperature within the aforementioned temperature range applying a compacting pressure on said thermoplastic player sufficiently high to bring it into intimate contact with said heated surface for a time sufficient to permit said thermoplastic layer to adhere thereto.

4. A method for applying a thermoplastic polymer of trifluorochloroethylene to a curved surface which comprises placing a layer of a thermoplastic comprising a polymer of trifluorochloroethylene having a no strength temperature value between about 220° C. and about 350° C. on said surface, heating said surface to a temperature between about 360° F. and about 625° F., after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto, and subsequently cooling said heated surface.

5. A method for applying a thermoplastic polymer of trifluorochloroethylene to a curved surface which comprises placing a layer of a thermoplastic comprising a polymer of trifluorochloroethylene having a no strength temperature value between about 240° C. and about 350° C. on said surface, heating said surface to a temperature between about 400° F. and about 625° F., after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto, and subsequently cooling said heated surface to a temperature between about 70° F. and about 350° F.

6. A method for applying a thermoplastic polymer of trifluorochloroethylene to a curved surface which comprises placing a layer of a thermoplastic comprising a polymer of trifluorochloroethylene having a no strength temperature value between about 240° C. and about 300° C. on said surface, heating said surface to a temperature between about 400° F. and about 625° F., after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto, and subsequently cooling said heated surface to a temperature between about 70° F. and about 350° F.

7. A method for applying a thermoplastic polymer of trifluorochloroethylene to a curved surface which comprises subjecting said surface to abrasion, placing a layer of a thermoplastic comprising a polymer of trifluorochloroethylene having a no strength temperature value between about 220° C. and about 350° C. on said surface, heating said surface to a temperature between about 360° F. and about 625° F., and after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto.

8. A method for applying a thermoplastic polymer of trifluorochloroethylene to a curved metallic surface which comprises subjecting said surface to abrasion, placing a layer of a thermoplastic comprising a polymer of trifluorochloroethylene having a no strength temperature value between about 220 C. and about 350° C. on said surface, heating said surface to a temperature between about 360° F. and about 625° F., and after initially heating said surface to the desired temperature within the aforementioned temperature range applying a compacting pressure on said thermoplastic layer sufficiently high to bring it into intimate contact with said heated surface for a time sufficient to permit said thermoplastic layer to adhere thereto.

9. A method for applying a thermoplastic polymer of trifluorohloroethylene to the interior surface of a metal cylinder which comprises introducing into said metal cylinder a plastic cylinder comprising a polymer of trifluorochloroethylene having a no strength temperature value between about 220° C. and about 350° C. and having an outside diameter slightly smaller than the inside diameter of said metal cylinder, heating said interior surface of said metal cylinder to a temperature between about 360° F. and about 625° F., and after initially heating said interior surface to the desired temperature within the aforementioned temperature range applying a compacting pressure within said plastic cylinder sufficiently high to bring it into intimate contact with the heated interior surface of said metal cylinder for a time sufficient to permit said plastic cylinder to adhere thereto.

10. A method for applying a thermoplastic polymer of trifluorochloroethylene to the interior surface of a metal cylinder which comprises introducing into said metal cylinder a plastic cylinder comprising a polymer of trifluorochloroethylene having a no strength temperature value between about 220° C. and about 350° C. and having an outside diameter slightly smaller than the inside diameter of said metal cylinder, heating said interior surface of said metal cylinder to a temperature between about 360° F. and about 625° F., after initially heating said interior surface to the desired temperature within the aforementioned temperature range applying a compacting pressure within said plastic cylinder sufficiently high to bring it into intimate contact with the heated interior surface of said metal cylinder for a time sufficient to permit said plastic cylinder to adhere thereto, and subsequently cooling said heated surface.

References Cited in the file of this patent

UNITED STATES PATENTS

| | | |
|---|---|---|
| 2,236,766 | Schneider | Apr. 1, 1941 |
| 2,340,452 | Child et al. | Feb. 1, 1944 |
| 2,343,225 | Pray et al. | Feb. 29, 1944 |
| 2,400,099 | | |
| 2,410,681 | | |
| 2,427,183 | | |
| 2,440,725 | | |
| 2,510,078 | | |
| 2,516,242 | | |
| 2,573,639 | | |
| 2,579,437 | | |
| | Brubaker | May 14, 1946 |
| | Rayburn | Nov. 5, 1946 |
| | Berry | Sept. 9, 1947 |
| | Munger | May 4, 1948 |
| | Compton et al. | June 6, 1950 |
| | Munger | July 25, 1950 |
| | Coler | Oct. 30, 1951 |
| | Miller | Dec. 18, 1951 |